US006915236B2

(12) United States Patent
Tanner et al.

(10) Patent No.: US 6,915,236 B2
(45) Date of Patent: Jul. 5, 2005

(54) METHOD AND SYSTEM FOR AUTOMATED REPAIR DESIGN OF DAMAGED BLADES OF A COMPRESSOR OR TURBINE

(75) Inventors: Joseph Steven Tanner, Watervliet, NY (US); Mark James Bailey, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 222 days.

(21) Appl. No.: 10/301,723

(22) Filed: Nov. 22, 2002

(65) Prior Publication Data

US 2005/0033555 A1 Feb. 10, 2005

(51) Int. Cl.$^7$ ................................................ G06F 11/30
(52) U.S. Cl. ....................... 702/183; 73/660; 29/402.08
(58) Field of Search ........................... 702/33–36, 81, 702/113–114, 155, 170, 157–158, 182–185, 188; 73/1.27–1.28, 577–578, 660, 112, 116; 29/402.03, 402.04, 402.05, 402.08

(56) References Cited

U.S. PATENT DOCUMENTS

| 4,422,333 A | * | 12/1983 | Leon ............................ 73/660 |
| 5,210,704 A | * | 5/1993 | Husseiny ....................... 702/34 |
| 5,686,669 A | * | 11/1997 | Hernandez et al. ............ 73/660 |
| 6,668,272 B1 | * | 12/2003 | Keller et al. ................. 709/203 |
| 6,701,615 B2 | * | 3/2004 | Harding et al. ............. 29/889.1 |

OTHER PUBLICATIONS

Brinksmeier et al., "Advanced Mechatronic Technology for Turbine Blades Maintenance", 1998, Power Station Maintenance—Profitability Through Reliability, 1998. First IEE/IMechE International Conference on (Conf. Publ. No. 452), pp. 184–189.*

Mercadal et al., "Damage Identification by NSMS Blade Resonance Tracking in Mistuned Rotors", Mar. 2001, Aerospace Conference, 2001, IEEE Proceedings, vol. 7, pp. 7–3263 through 7–3277.*

Domijan et al., "Using PC–Based Data Acquisition to Prevent Turbine Blade Damage from Cycling Service and for On–Line Performance Monitoring on an 81–Megawatt Steam–Cycle Electric Power Generating Unit", 1992, Energy Conversion, IEEE, v7, pp 57–63.*

K.J. Pallos, GE Energy Services Technology, Atlanta, GA "Gas Turbine Repair Technology".

* cited by examiner

*Primary Examiner*—Marc S. Hoff
*Assistant Examiner*—Mary Catherine Baran
(74) *Attorney, Agent, or Firm*—Nixon & Vanderhye, P.C.

(57) ABSTRACT

A method is disclosed for evaluating a damaged blade in a compressor or turbine using a computer system accessing a database of blade repair information, where the method includes: selecting a blade damage geometry category corresponding to the damage of the blade from a plurality of blade damage geometry categories; measuring the blade damage, and generating a repair geometry for the blade based on the blade damage measurements and the selected blade damage geometry category.

11 Claims, 4 Drawing Sheets

METHOD AND SYSTEM FOR AUTOMATED REPAIR DESIGN OF DAMAGED BLADES OF A COMPRESSOR OR TURBINE

BACKGROUND OF THE INVENTION

The field of the invention is related to turbine and compressor blades, and in particular to the repair of such blades.

Blades in an axial turbine or compressor can be damaged, such that the blade is chipped, bent or otherwise deformed. A deformed blade may perform poorly and can further damage the compressor or turbine. Detecting a damaged blade and correctly repairing the blade promptly may avoid additional machine failure and damage.

Conventional methods for detecting and repairing a damaged turbine or compressor blade are generally time consuming, inefficient and susceptible to a high rate of error in their interpretation and application. These methods typically involve the use of manuals directed to the operation, use and repair of the machine or particular machine part, e.g., a turbine blade. Included in such manuals are drawings, diagrams, schematics and the like that usually require some interpretation by the repair technician.

A blade repair technician is usually experienced with blade repairs or may engage in extensive communication with an engineer familiar with the construction and operation of the machine or machine part to be repaired. Oftentimes, the length of time to detect, diagnose, solve and repair a damaged blade consumes many days or weeks, resulting in an inordinate and expensive machine downtime. Common errors or miscommunications that compound the blade repair efforts include misinterpretation or misapplication of the blade schematics, drawings and such, or of the blade repair directions provided in manuals for the blades. Such misinterpretation and misapplication can result in unacceptable or unsuccessful repair, and lead to subsequent damage and delay. Accordingly, there is a long felt need for a fast and reliable system to assist blade repair technicians, and to provide instructions regarding the repair of damaged blades.

BRIEF DESCRIPTION OF THE INVENTION

An automated system has been developed for use in categorizing and evaluating damaged blades of a turbine or compressor, and generating blade repair instructions. The system may be implemented in software that automatically generates diagnostic, design and repair information such as damage assessment, blade geometry, performance impact, evaluation and instructions for repairing damaged compressor or turbine blades.

In one embodiment, the invention is a method for evaluating a damaged blade in a compressor or turbine using a computer system accessing a database of blade repair information, where the method includes: selecting a blade damage geometry category corresponding to the damage of the blade from a plurality of blade damage geometry categories; measuring the blade damage, and generating a repair geometry for the blade based on the blade damage measurements and the selected blade damage geometry category.

In a second embodiment the invention is a system for evaluating a damaged blade in a compressor or turbine having a computer system accessing a database of blade repair information; an interactive damaged blade disposition form generated by said computer system, where the disposition form includes data fields for entering blade identification information, damage type and blade damage dimensions; and a blade repair geometry form displaying a repair geometry diagram and repair geometry dimensions generated by said computer system based on the blade damage type and blade damage dimensions entered through said disposition form.

DETAILED DESCRIPTION OF THE INVENTION

An automated computer software system has been developed to allow an engineer or field technician to categorize the damage on a blade, evaluate whether the blade needs to be or should be repaired, and generate a repair geometry for a damaged turbine or compressor blade. Automating the evaluation and repair of damaged turbine and compressor blades is expected to reduce the period needed to diagnose and repair damaged blades from several days to a few hours.

The software package assists in the diagnosis of damaged blades by assisting an engineer or technician to determine whether the damage blade deviates from acceptable dimensions and, if so, whether the blade is repairable. The software package may be implemented on a spread sheet software program that may be executed on a conventional computer system.

Figure 1:
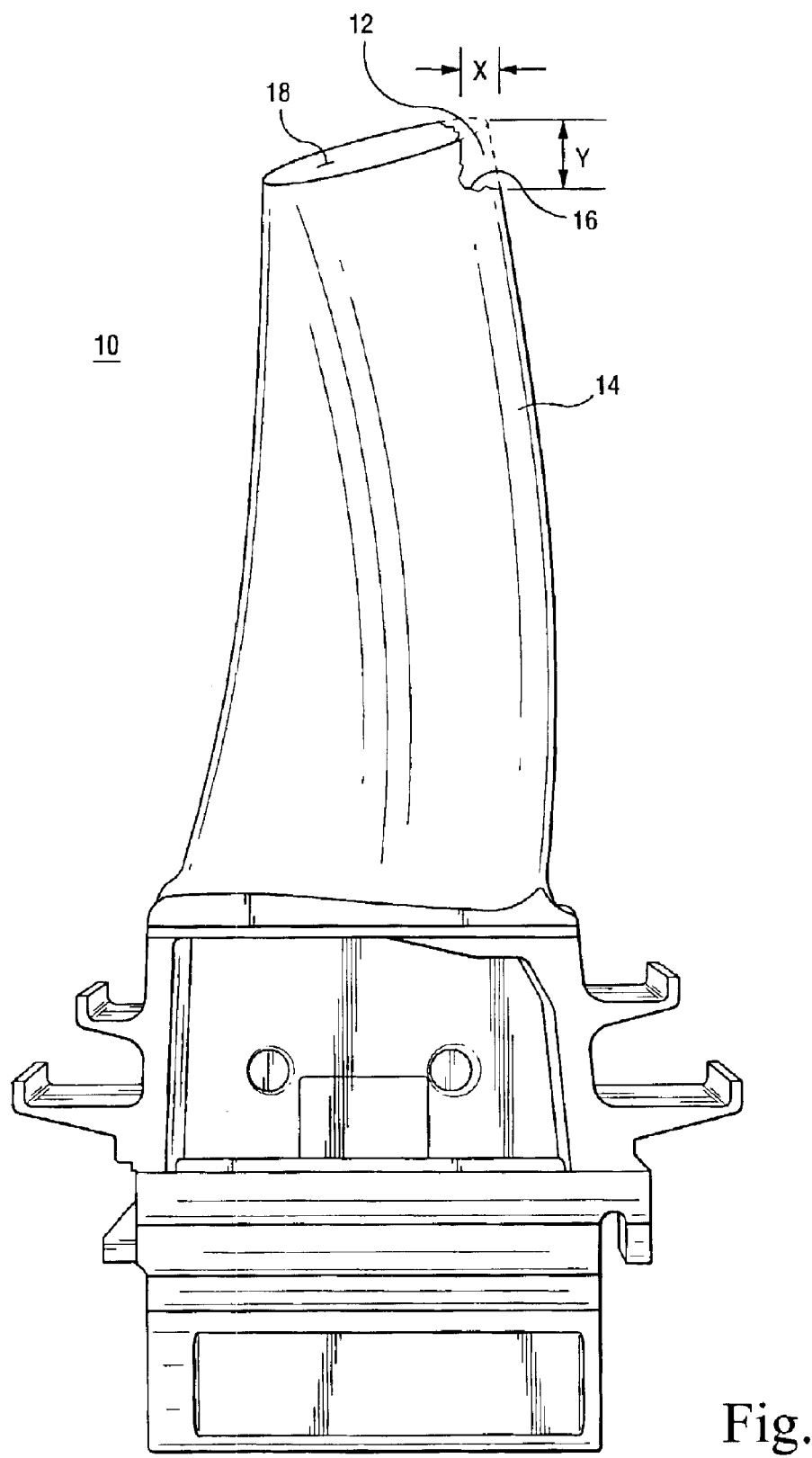
FIG. 1 shows an exemplary damaged blade of a compressor.

FIG. 1 shows an exemplary damaged blade 10 of an axial compressor or turbine. The blade has a missing tip point 12 at the leading edge (LE) 14 of the blade. The missing tip point broke off from the blade tip 18. The missing tip point may affect the performance of the compressor or turbine. Moreover, the jagged edge 16 of the broken tip point may promote fatigue cracks in the blade and could cause the blade to be further damaged or fail. The missing tip point is one example of several types of damage that occurs to the geometry of blades. Other types of blade damage includes bent blade tips, cracks in the blade, and dents and nicks in the leading edge of the blade.

Damaged blades are generally detected when a turbine or compressor is stopped and opened for inspection. During inspection, each row of blades of the turbine and compressor are visually reviewed to determine whether the geometry of any blade has been damaged. When faced with a damaged blade, a technician generally determines whether the blade needs repair and whether it can be repaired.

Figure 2:
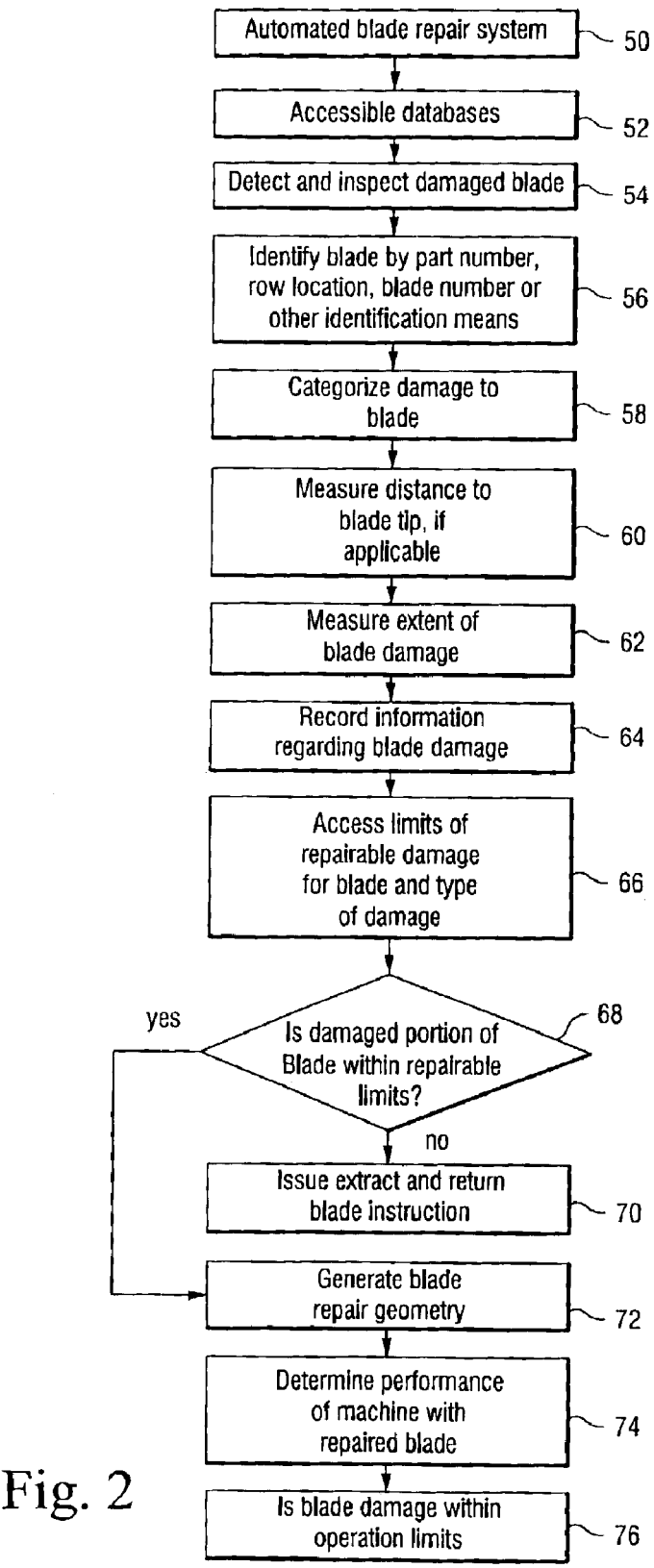
FIG. 2 is a flow chart describing a system to categorize and evaluate the damaged blade, and to generate a proposed blade repair geometry.

FIG. 2 is a high-level flow chart of the steps performed by the automated blade repair system 50. The automated damaged blade repair system 50 assists a technician to determine whether a damage blade requires repair and whether the blade is repairable. If the blade is repairable, the system also generates a proposed blade repair geometry to guide the technician when repairing the blade. The types of repairs suggested by the proposed blade geometry are generally performed on the blade while mounted in a compressor or turbine. The suggested repair generally involves a technician machining the damaged portion of the blade to cut away cracks and other damaged regions of the blade, smooth the edges of the damaged portion to blend the edges into the remaining portion of the blade, and to round or straighten the edges of the damaged portion of the blade. The automated damaged blade repair system 50 generates a suggested repair geometry to guide the technician when machining the damaged blade.

The automated damaged blade repair system 50 may be executed on a conventional computer system may have conventional processors and storage devices to operate the software package, and may access databases 52 having information regarding the blades of gas turbine with the damaged blade, blade damage assessment information and historical information regarding repairs made (or not made) to blades.

In particular, the database may include information regarding previously damaged blades including the location and damage geometry of the blade, the repair geometry made to the blade, and the impact on performance of the compressor or turbine due to the damaged blade and the repaired blade. This database of previously damaged blades may also include information regarding damaged blades that were not repairable, and the types and geometry of the damage which were deemed to be unrepairable. By identifying data regarding similar repairs made previously to blades of the same type as a damaged blade, the system 50 enables operators to quickly compare a damaged blade to repaired blades of the same type. The system 50 also compare the extend of damage done to a blade to established limits to determine whether the damaged blade is repairable on-site and to generate a proposed repair geometry. The databases accessible by the software package may also include blade geometry standards, for a wide variety of blades.

A damaged blade is detected, step 54, usually by a technician inspecting the blades of a compressor or turbine. The inspection is performed while the compressor or turbine is at a stand still. During this period the machine, e.g. a gas turbine, with the compressor and turbine is off-line and is not generating power. There is generally a great demand to minimize these off-line periods which creates a need to reduce the time needed to inspect and repair blades.

If a damaged blade is detected, the technician uses the automated blade repair system 50 to determine whether the blade may be repaired on-site and to generate a proposed repair geometry. The repair system 50 may be a software program adapted to run on a conventional spread sheet program on a laptop computer readily available to the technician. The automated blade repair system 50 provides the technician with a tool to access database records regarding similar damage to blades as that the technician is facing with the current damaged blade. The system 50 also guides the technician through a process of analyzing the damaged blade.

Figure 3:
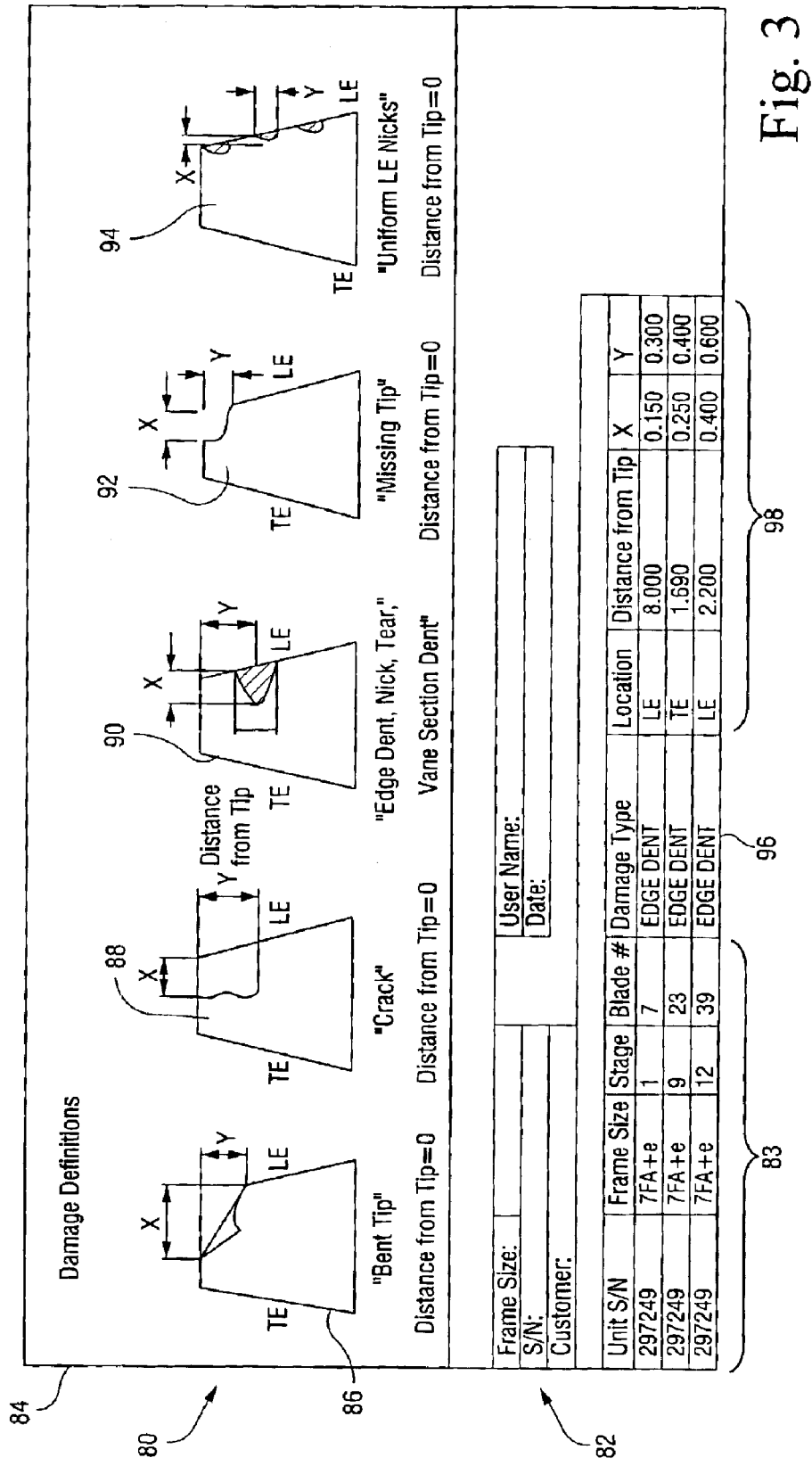
FIG. 3 is an exemplary interactive blade damage form.

FIG. 3 is an exemplary damaged blade disposition electronic form 80 that prompts the technician to enter certain information regarding the damaged blade. The form includes identifying database fields 82, which are linked to the corresponding databases 52, for entering information to identify the machine serial number, customer name, machine size and other identifying information useful in determining the blades that have been damaged. In step 56, the information needed to identify the blade and its associated machine are is entered into the form via the database fields 82. To use the software package to evaluate a damaged blade, the blade technician enters the blade part number (or numbers if multiple blades are damages) into a database fields 83 for the blade identifying information.

Using the blade identifying information, the blade repair system 50 retrieves from the databases 52 the desired blade geometry as well as information regarding acceptable deviations from the desired blade geometry, repairable damage to the blade and performance impact to the gas turbine (or other device having the affected compressor or turbine). The entered information may be used to generate an appropriate electronic form that is specific to blades from the identified machine or to display exemplary damaged blade diagrams that correspond to the actual blade that has been damaged.

The exemplary form also includes damaged blade diagrams 84 showing various types of blade damage. These diagrams assist the technician in categorizing the damage on the blade, in step 58. The diagrams may be specific to certain types of blades, e.g., compressor or turbine blade, and the appropriate diagrams 84 and form 80 may be generated from database information after the technician has identified the machine that has the damaged blade.

The diagrams may show blade damage types of: bent blade tip 86; crack in blade 88; dent, nick or tear in the blade 90, missing blade tip point 92 and leading edge nicks in the blade 94. By comparing the damaged blade diagrams to the actual blade damage, a technician selects the proper blade damage category, and enters or selects that category into damage type database field 96 in the form 80 in the form row that has been setup for entering information regarding the damaged blade.

The damaged blade diagrams 84 also indicate the measurements to be made of the damage to the blade, for each type of blade damage. Generally, a measurement is made of the distance (Y) from the blade tip 18 to the lower end of the damaged portion of the blade, in step 60. In addition, measurements are made of the extent of the damage to the blade, in step 62. For example, the width (X) of the damaged portion may be measured of a blade with a missing tip. The measurements of the damaged portions of the blade are recorded in the database, in step 64, by entering the measurements into the database fields 98 for damage measurements.

Using the entered data regarding the damage blade, the blade repair system 50 compares the geometry of the damage blade to the blade geometry limits established for the blade, in step 66. The database of 52 includes information regarding blades and the geometry limits on permissible repairs that may be made by grinding the blade. The blade geometry limits may include ranges of the desired blade dimensions acceptable for an operating blade, and the types and ranges of blade damage dimensions that may be repaired by grinding the blade on the compressor or turbine.

The system 50 determines if the damaged portion of the blade is within repairable limits, in step 68. The measurements of the damaged portions of the blade are compared to the repairable limits to determine if the blade may be repaired while in place on the compressor turbine. If the damaged portion of the blade exceeds the repairable limits, then the system 50 may advise the technician to extract the damaged blade from the compressor or turbine, and replace the blade or arrange for a customize repair of the blade, in step 70. Extracting a compressor blade involves unstacking the rotor disks which generally involves a major expense and time delay for repairing the compressor. Further, a customized repair of a blade may need to be performed by the blade manufacturer. Accordingly, it is preferable to repair the blade on the compressor rather than extracting the blade for repair.

If the damage to the blade is within acceptable repair limits, then the system generates a proposed repair geometry for the blade, in step 72. To determine an appropriate repair geometry for a damage blade, the software analyzes a number of blade geometries by stage, location of the damage on the blade, and product type. The software compares the damage geometry of the damaged blade to the engineering limits and repair geometry of selected other repaired (or unrepairable) blades that are comparable to the damaged blade. Assuming that the damage is repairable, the software determines an optimum repair or blend geometry by mapping an area of the blade beyond the damage region that is to be cut away from the blade or to be blended with the remaining portion of the blade. The system may also determine whether the repair geometry should be, for example, triangular in shape (see Type I tip crop) or rectangular in shape (see Type II tip crop) depending predetermined criteria for blade repair and the dimension of the damaged area of the blade.

The map of the repair geometry may be determined by adding a predetermined distance, e.g., 0.125 inches, to the damaged region to create a geometry of a repair region that removes the blade damage. The shape and some dimensions of the repair geometry, e.g., corner radii, may be based on established repair outlines stored in the database as corresponding to the damaged blade and type of blade damage.

Figure 4:
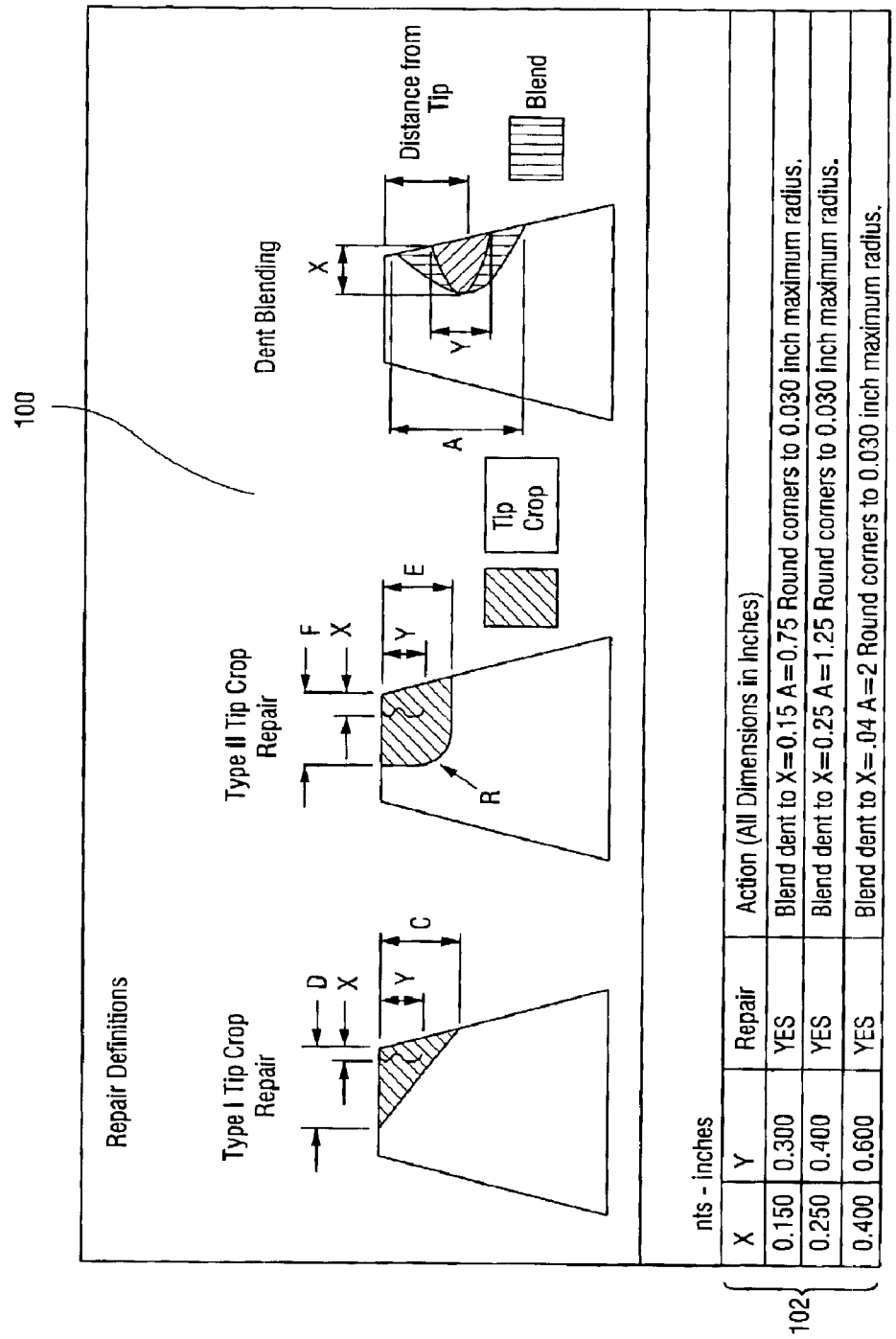
FIG. 4 is an exemplary blade repair geometry form.

The proposed repair geometry is displayed on an electronic repair geometry form 100 generated by the system, such as is shown in FIG. 4. The repair geometry form includes repair diagrams showing the shape of the repair to be made to the blade. In addition, the proposed repair includes instructions 102, such as the dimensions of the repair, radii dimension of corners in the repair, and other information that may assist in grinding a repair to the blade. These instructions may be pulled from a database of repair instructions for the type of blade repair corresponding to the damaged blade. In addition, algorithms executed by the system 50 may convert the measured dimensions of the damaged region of the blade into repair dimensions. The instructions and algorithms may be unique to each blade type and machine, and can be developed by the blade manufacturer.

The system 50 makes the instructions and algorithms readily accessible to technicians repairing blades on site of the compressor or turbine. The software system 50 generates the appropriate repair geometry based on the type of blade damage and the dimensions of the damage. The repair geometry along with a repair illustration and instruction is created on screen and in a printable format. The technician can then use the results as an engineering disposition and begin repairing the hardware.

The software system 50 may also sum the total amount of blades and blade area to be repaired or removed to provide an estimate of the impact on the performance of the gas turbine (or compressor) with the repaired components, in step 74. The performance impact is predicted based on data regarding the performance effects that previous blade repairs have had on a compressor or turbine. The performance impact of blade repairs is stored in the database and is available to the system 50. Should the performance impact exceed a predetermined limit, the user is directed to contact engineering for review and approval.

Certain damage to blades, such as small nicks in the leading edge of a blade, may not require repair. For these types of damage, the system 50 determines if the damaged blade has dimensions within the acceptable operating ranges, in step 76. If the damage is within the acceptable limits, then no repair is needed to the blade. If the damage exceeds these limits, then the system determines if the damage is repairable, in the manner discussed above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for evaluating a damaged blade in a compressor or turbine using a computer system accessing a database of blade repair information, said method comprising:
   a. selecting a blade damage geometry category corresponding to the damage of the blade from a plurality of blade damage geometry categories stored in said database;
   b. measuring the blade damage and inputting into the computer system blade damage measurements, and
   c. generating a repair geometry for said blade damage based on the blade damage measurements and the selected blade damage geometry category, wherein said repair geometry is generated by said computer system and includes dimensions of the repair geometry, and displaying a diagram of the blade repair geometry.

2. A method as in claim 1 further comprising identifying the damaged blade and accessing a database of information regarding the identified blade.

3. A method as in claim 1 wherein the blade damage geometry category is selected for a plurality of categories including bent blade tip, missing blade tip, blade crack, and blade edge dent, and wherein each category is graphically displayed by the computer system.

4. A method as in claim 1 wherein measuring the damage of the blade includes measuring a distance from a blade tip to the damage.

5. A method as in claim 1 further comprising comparing the blade damage measurements to repairable blade limits accessed from said database and corresponding to said selected blade damage geometry category, and generating the blade repair geometry after determining that the blade damage measurements are within said limits.

6. A method as in claim 5 further comprising generating an instruction to extract the damaged blade after determining that the blade damage measurements are beyond said limits.

7. A method as in claim 1 wherein said generating the blade repair geometry includes generating instructions regarding blade repair dimensions.

8. A method as in claim 1 further comprising determining an effect of the blade repair on a performance of the compressor or turbine.

9. A system for evaluating a damaged blade in a compressor or turbine comprising:
   a computer system accessing a database of blade repair information;
   an interactive damaged blade disposition form generated by said computer system, said disposition form including data fields for entering blade identification information, damage type and blade damage dimensions, and
   a blade repair geometry form generated by said computer system including a displayed repair geometry diagram and repair geometry dimensions generated by said computer system based on the blade damage type and blade damage dimensions entered through said disposition form.

10. A system as in claim 9 wherein said data fields for entering blade identification information are electronically linked to a database of information regarding blades corresponding to the damaged blade.

11. A system as in claim 9 wherein said damage type is selectable from a plurality of damage types including bent blade tip, missing blade tip, blade crack, and blade edge dent.

* * * * *